(12) United States Patent
Cheung et al.

(10) Patent No.: US 9,185,954 B2
(45) Date of Patent: *Nov. 17, 2015

(54) SHELL WITH KICKSTAND

(71) Applicant: SUPERIOR COMMUNICATIONS, INC., Irwindale, CA (US)

(72) Inventors: Mervyn Cheung, Alhambra, CA (US); Charlie LaColla, Woodland Hills, CA (US)

(73) Assignee: Superior Communications, Inc., Irwindale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/374,658

(22) PCT Filed: Feb. 4, 2013

(86) PCT No.: PCT/US2013/024640
§ 371 (c)(1),
(2) Date: Jul. 25, 2014

(87) PCT Pub. No.: WO2013/116842
PCT Pub. Date: Aug. 8, 2013

(65) Prior Publication Data
US 2014/0332418 A1  Nov. 13, 2014

Related U.S. Application Data

(60) Provisional application No. 61/594,260, filed on Feb. 2, 2012.

(51) Int. Cl.
*A45C 11/00* (2006.01)
*H04B 1/3877* (2015.01)
(Continued)

(52) U.S. Cl.
CPC ............... *A45C 11/00* (2013.01); *F16M 11/10* (2013.01); *F16M 11/105* (2013.01); *F16M 11/38* (2013.01);
(Continued)

(58) Field of Classification Search
CPC ...... A45C 11/00; A45C 13/004; A45C 13/02; A45C 13/025; A45C 2011/002; A45C 2011/003; A45C 2200/15; F16M 11/00; F16M 11/04–11/041; F16M 11/10; F16M 11/105; F16M 11/38; F16M 13/00; F16M 13/005; F16M 13/02; F16M 13/04; F16M 2200/024; F16M 2200/08; H04M 1/0214; H04M 1/04; H04M 1/11–1/12; A47B 23/042–23/044; G09F 1/1628
USPC ............ 206/45.2, 45.24; 248/220.21–220.22, 248/221.11, 223.41, 371, 460–461, 463; 455/575.1
See application file for complete search history.

(56) References Cited

U.S. PATENT DOCUMENTS 4,622,767 A * 11/1986 Sullivan ........................ 40/120
4,770,385 A    9/1988 Bahm
(Continued)

FOREIGN PATENT DOCUMENTS

GB         2288790      11/1995
JP       2002-027074    1/2002
(Continued)

OTHER PUBLICATIONS

Korean IP Office, PCT International Search Report for PCT/US2013/024640, May 2013, 3 pages.
(Continued)

*Primary Examiner* — Bryon Gehman
*Assistant Examiner* — Brijesh V. Patel
(74) *Attorney, Agent, or Firm* — Snell & Wilmer LLP

(57) ABSTRACT

An apparatus and/or systems related to a case for a mobile device. A protective case may include a stand portion which slides out to an open position for propping up the mobile device at a predetermined angle for viewing by a user. As the user switches the viewing orientation of the mobile device (e.g., by physically rotating the mobile device 90 degrees), the stand portion continues to prop up the mobile device at the predetermined angle.

20 Claims, 5 Drawing Sheets

(51) Int. Cl.
*H04M 1/04* (2006.01)
*F16M 11/10* (2006.01)
*F16M 11/38* (2006.01)
*F16M 13/00* (2006.01)

(52) U.S. Cl.
CPC ............ *F16M 13/00* (2013.01); *H04B 1/3877* (2013.01); *H04M 1/04* (2013.01); *A45C 2011/002* (2013.01); *A45C 2011/003* (2013.01); *A45C 2200/15* (2013.01)

(56) References Cited

U.S. PATENT DOCUMENTS

| | | | |
|---|---|---|---|
| 5,732,928 A * | 3/1998 | Chang | 248/688 |
| 6,971,622 B2 * | 12/2005 | Ziegler et al. | 248/454 |
| 7,001,088 B2 * | 2/2006 | Hui-hu | 400/681 |
| 7,104,516 B2 * | 9/2006 | Uto et al. | 248/688 |
| 8,162,283 B1 * | 4/2012 | Royz et al. | 248/455 |
| 2003/0213886 A1 * | 11/2003 | Gilbert | 248/454 |
| 2005/0264988 A1 * | 12/2005 | Nicolosi | 361/683 |
| 2009/0017883 A1 | 1/2009 | Lin | |
| 2010/0051775 A1 * | 3/2010 | Wu et al. | 248/371 |
| 2010/0072334 A1 * | 3/2010 | Le Gette et al. | 248/176.3 |
| 2010/0142130 A1 * | 6/2010 | Wang et al. | 361/679.01 |
| 2010/0171671 A1 * | 7/2010 | Park | 343/720 |
| 2010/0308202 A1 | 12/2010 | Hu et al. | |
| 2011/0050063 A1 | 3/2011 | Wang et al. | |
| 2011/0074257 A1 * | 3/2011 | Li | 312/223.1 |
| 2012/0125791 A1 * | 5/2012 | Parker et al. | 206/45.2 |
| 2013/0027866 A1 * | 1/2013 | Williams et al. | 361/679.22 |
| 2013/0277237 A1 * | 10/2013 | Wang | 206/45.2 |
| 2014/0262854 A1 * | 9/2014 | Chen et al. | 206/45.24 |

FOREIGN PATENT DOCUMENTS

| | | |
|---|---|---|
| KR | 20-0350285 | 5/2004 |
| KR | 10-1088475 | 11/2011 |
| KR | 2011-0011777 | 12/2011 |
| WO | WO/2012/055040 | 5/2012 |

OTHER PUBLICATIONS

European Patent Office, European Search Report for 13743073.2-1751 / 2809194 PCT/US2013/024640, Aug. 24, 2015, 73 pages.

\* cited by examiner

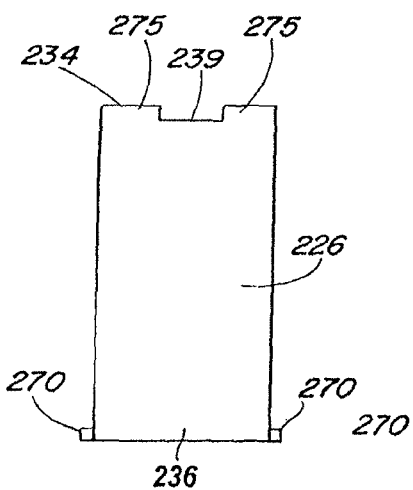 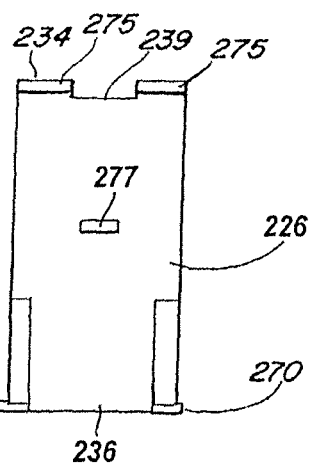 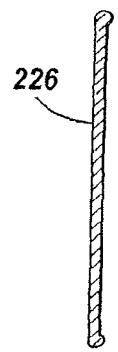
FIG. 2A     FIG. 2B     FIG. 2C
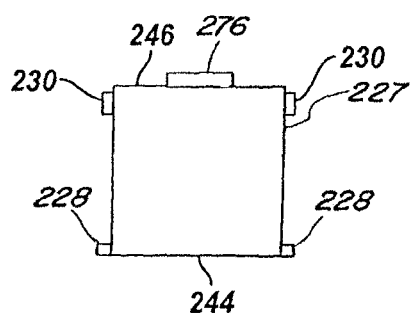 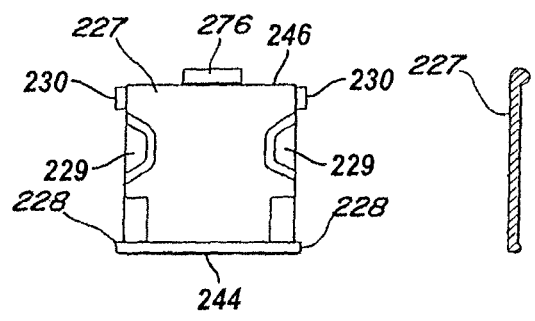
FIG. 2D     FIG. 2E     FIG. 2F

SHELL WITH KICKSTAND

CROSS REFERENCE TO RELATED APPLICATIONS

This application claims the benefit and priority of U.S. Provisional Application No. 61/594,260, filed on Feb. 2, 2012, the entire contents of which are hereby incorporated by reference.

BACKGROUND

1. Field

The present disclosure relates to an apparatus and/or systems related to a protective case or shell for a mobile device. The case may include a stand portion for propping up the mobile device for viewing by a user.

2. Description of Related Art

Mobile devices such as smartphones, tablet computers and the like are gaining widespread popularity. For example, millions of the Apple® iPhone® and the Apple® iPad® have been sold to date. The success of other major competitors such as Motorola®, Samsung®, HTC®, etc. only further confirms that consumers have adopted mobile devices. Consumers wish to protect and enhance the functionality of their products. Accordingly, manufacturers have produced different cases and other accessories to help the consumer keep their mobile devices safe.

However, certain of these cases do not allow a user to prop up the mobile device for hands-free viewing at a comfortable angle. Other cases which allow the user to prop up the mobile device are overly-complicated or unstable and require the user to test the various angles provided to determine a suitable angle which is both time consuming and requires significant effort on the part of the user. Other cases which allow the user to prop up the mobile device at a pre-defined, desired angle do not maintain the angle when the user switches orientation of the mobile device (e.g., changing the view from a "portrait-style" to a "landscape-style" by simply rotating the mobile device).

SUMMARY

The present disclosure relates to an apparatus and/or systems related to a case for a mobile device. The case may include a pull-out stand portion for propping up the mobile device at a predetermined angle for viewing by a user. As the user switches the viewing orientation of the mobile device (e.g., by physically rotating the mobile device 90 degrees), the pull-out stand continues to prop up the mobile device at the predetermined angle.

BRIEF DESCRIPTION OF THE DRAWINGS

The features, obstacles, and advantages of the present disclosure will become more apparent from the detailed description set forth below when taken in conjunction with the drawings, wherein:

FIG. 2A illustrates an outer side of a sliding plate of the protective case according to one implementation of the present disclosure.

FIG. 2B illustrates an inner side of the sliding plate of FIG. 2A according to one implementation of the present disclosure.

FIG. 2C illustrates a side view of the sliding plate of FIG. 2A according to one implementation of the present disclosure.

FIG. 2D illustrates an outer side of a pivoting plate of the protective case according to one implementation of the present disclosure.

FIG. 2E illustrates an inner side of a pivoting plate of FIG. 2D according to one implementation of the present disclosure.

FIG. 2F illustrates a side view of the pivoting plate of FIG. 2D according to one implementation of the present disclosure.

DETAILED DESCRIPTION

Apparatus, systems and/or methods that implement the implementations of the various features of the present disclosure will now be described with reference to the drawings. The drawings and the associated descriptions are provided to illustrate some implementations of the present disclosure and not to limit the scope of the present disclosure. Throughout the drawings, reference numbers are re-used to indicate correspondence between referenced elements.

Figure 1A:
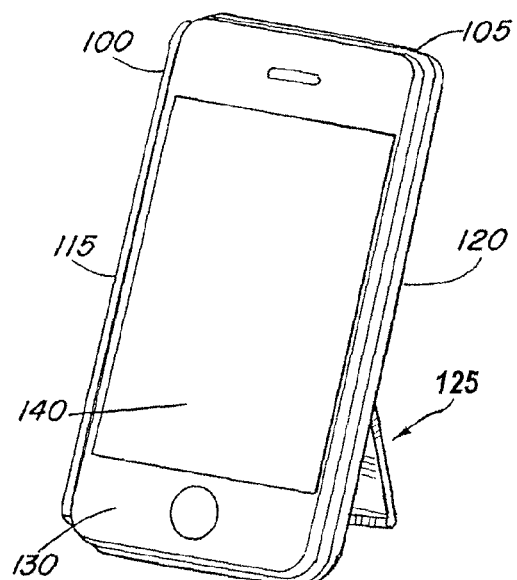
FIG. 1A illustrates a mobile device housed within a protective case with a stand portion in an open position according to one implementation of the present disclosure.

FIG. 1A illustrates an exemplary implementation of a protective case 100 housing a mobile device 130 by substantially covering the entire mobile device 130 except for the screen side and providing cutout portions to allow for access to certain portions of the mobile device 130 (e.g., a camera lens, various ports, switches, and the like). More particularly, the protective case 100 includes a top side 105, a bottom side 110, a left side 115, a right side 120 and a back side 135 while leaving the front side 140 available for viewing by the user. The protective case 100 further includes a stand portion 125.

Figure 1B:
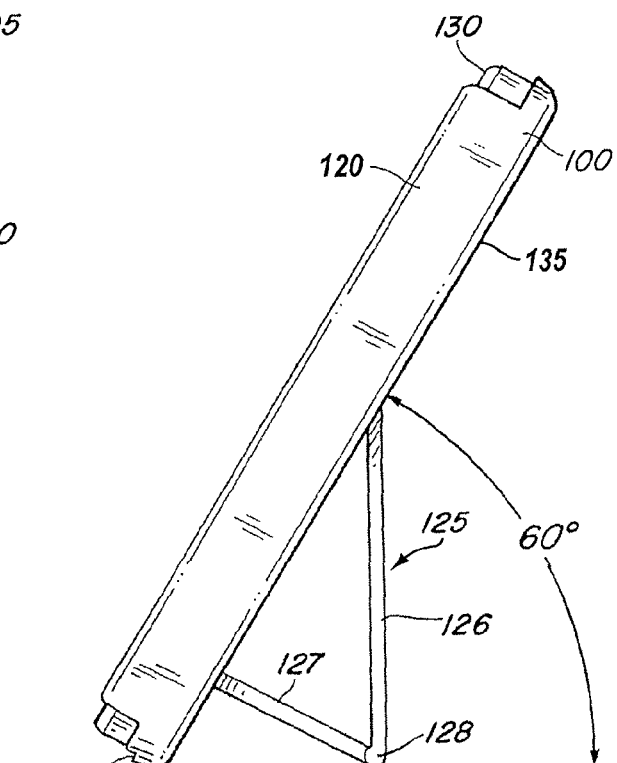
FIG. 1B illustrates a side view of the mobile device housed within the protective case of FIG. 1A propped up at an angle of about 60° in a portrait-style orientation according to one implementation of the present disclosure.

FIG. 1B illustrates a side view of the right side 120 of the protective case 100. When the stand portion 125 is in an open position, the protective case 100 props up the mobile device 130 on a flat surface at a predetermined viewing angle. In FIG. 1B, the mobile device 130 is placed in a "portrait-style" orientation, advantageously providing a viewing angle of approximately 60 degrees (e.g., between about 50 degrees to about 70 degrees). The stand portion 125 includes a sliding plate 126 attached to a pivoting plate 127 at a hinge 128.

When the stand portion 125 is engaged in the portrait-style orientation, only the bottom side 110 and the hinge 128 contact the flat surface. The bottom side 110 of the protective case 100 provides a stable contact point for propping up the mobile device 130. In addition, the hinge 128 advantageously provides a stronger, more stable contact point than a single kickstand structure because the hinge 128 is further supported by the sliding plate 126 and the pivoting plate 127 which may be held together by a pin, such as a pin 190 in FIG. 1G. In addition, the hinge 128 advantageously provides stability because the entire width of the hinge 128 serves as the contact point.

Figure 1C:
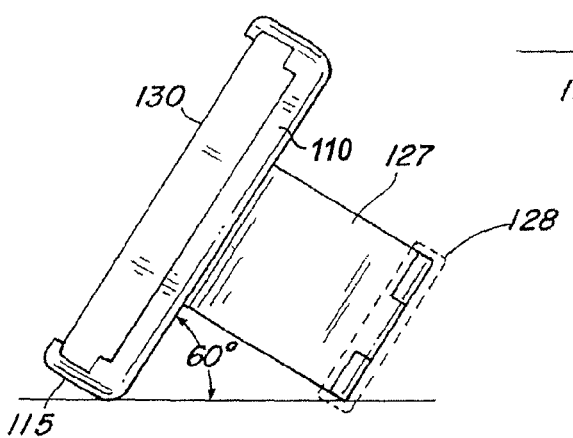
FIG. 1C illustrates a side view of the mobile device housed within the protective case of FIG. 1A propped up at an angle of about 60° in a landscape-style orientation according to one implementation of the present disclosure.

The mobile device 130 may be placed in a "landscape-style" orientation by rotating the protective case 100 and the mobile device 130 clockwise or counterclockwise by 90 degrees. In FIG. 1C, the protective case 100 and the mobile device 130 seen in FIG. 1A have been rotated 90 degrees counterclockwise. The protective case 100 still allows the user to view the mobile device 130 substantially at the same viewing angle of approximately 60 degrees (e.g., between about 50 degrees to about 70 degrees). The left side 115 provides a broad and stable contact point. Alternatively, the right side 120 may provide the contact point, if the mobile device 130 was placed in the opposite landscape-style orientation. The hinge 128 again provides a contact point which is stronger and more stable than a single kickstand structure as it is supported by at least the sliding plate 126 and the pivoting plate 127 as well as the pin 190. Moreover, the use of two plates joined at a hinge reduces the likelihood of the stand portion 125 buckling under the weight of the protective case 100 and the mobile device 130. In this manner, the user may continue to view the mobile device 130 at the desirable 60 degree viewing angle without having to reposition himself.

Figure 1D:
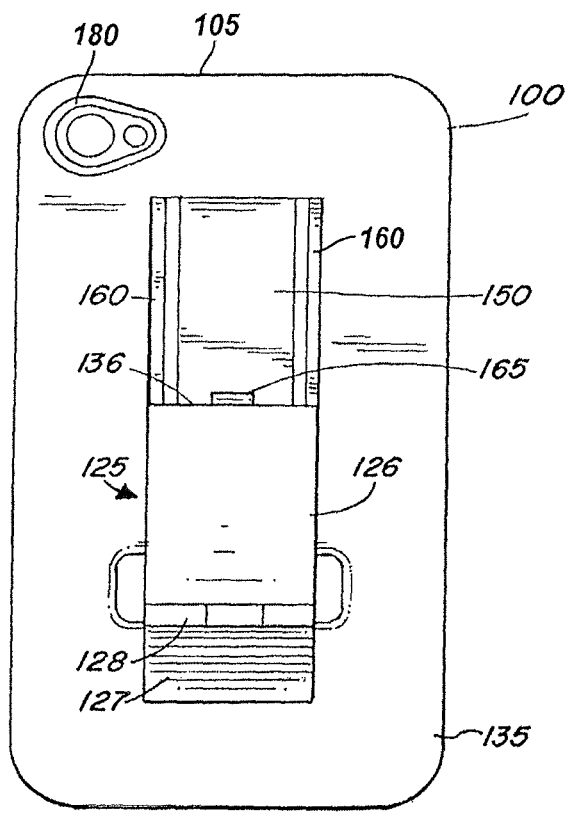
FIG. 1D illustrates a rear view of the mobile device housed within the protective case of FIG. 1A with the stand portion in the open position according to one implementation of the present disclosure.

FIG. 1D illustrates the back side 135 of the protective case 100 having the stand portion 125 in the open position. As seen in FIG. 1D, the back side 135 has a camera hole 180. Further seen in FIG. 1D, a stand receiving portion 150 is partially exposed when the stand portion 125 is in the open position. The sliding plate 126 slides along parallel tracks 160 until a non-pivot edge 136 of the sliding plate 126 is engaged by a stopper 165, integrated into the back side 135 on the stand receiving portion 150. The stopper 165 prevents the sliding plate 126 from sliding back into the closed position. The stopper 165 locks the stand portion 125 in the open position in order to prop up the protective case 100 and the mobile device 130.

Figure 1E:
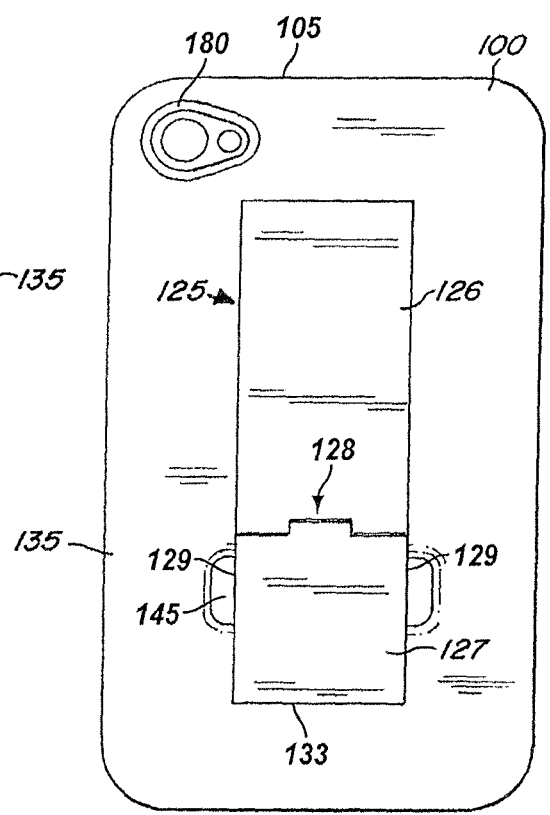
FIG. 1E illustrates a rear view of the mobile device housed within the protective case of FIG. 1A with the stand portion in a closed position according to one implementation of the present disclosure.

To retract the stand portion 125 back into the stand receiving portion 150, the user may maneuver the non-pivot edge 136 past the stopper 165. For example, the user may slightly lift the non-pivot edge 136 to disengage the stopper 165. Once the non-pivot edge 136 is no longer engaged or stopped by the stopper 165, the sliding plate 126 may slide along the parallel tracks 160 towards the top side 105. When fully retracted, the sliding plate 126 and the pivoting plate 127 flatten and become parallel with the back surface 135. FIG. 1E illustrates the stand portion 125 flattened against the back side 135 and covering the stand receiving portion 150 to provide the user with a substantially flat back surface when the user no longer wishes to utilize the stand functionality. The stand portion 125 fully retracts into the stand receiving portion 150 so as not to impede the user's operation of the mobile device 130.

In a substantially reverse manner, when the user wishes to pull out the stand portion 125 into the open position, the user may place his fingers at an indent 145 and lift exposed edges 129 of the pivoting plate 127, thereby causing the hinge 128 to bend away from the back side 135. As the hinge 128 bends, the pivoting plate 127 pivots away from the back side 135 along a pivot edge 133. This motion further causes the non-pivot edge 136 of the sliding plate 126 to slide along the parallel tracks 160 away from the top side 105 and toward the stopper 165. Once the non-pivot edge 136 is engaged with the stopper (as shown in FIG. 1D), the stand portion 125 is locked into the open position and the user may orient the protective casing 100 and the mobile device 130 held therein in either a portrait-style orientation or a landscape-style orientation while maintaining the 60 degree viewing angle.

Figure 1F:
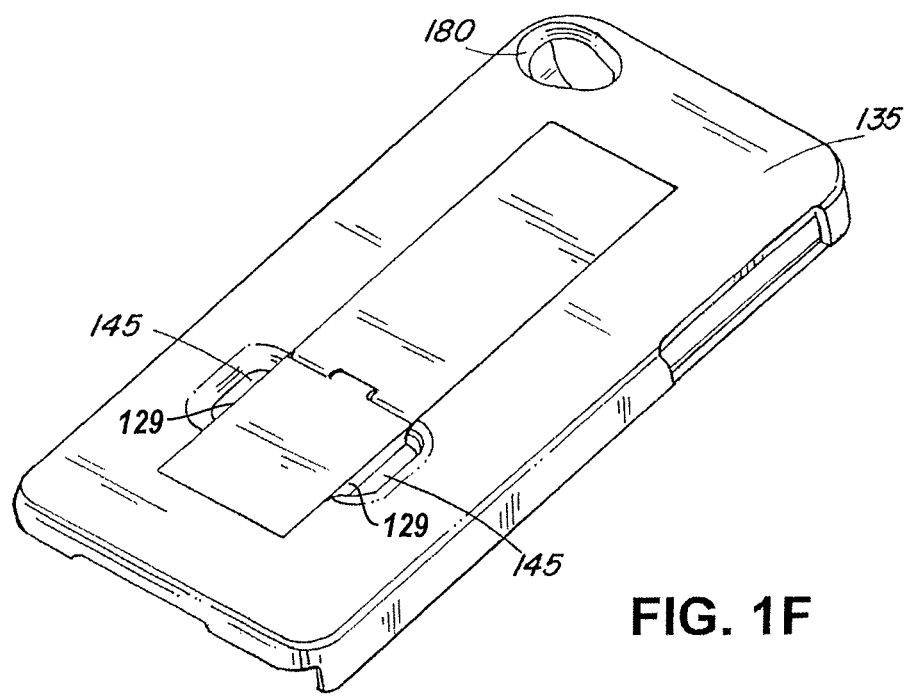
FIG. 1F illustrates a perspective rear view of the protective case of FIG. 1A with the stand portion in the closed position according to one implementation of the present disclosure.

FIG. 1F is a perspective view of the protective casing 100 having the stand portion 125 retracted into the protective casing 100. FIG. 1F shows how the exposed edges 129 are exposed by an indent 145.

Figure 1G:
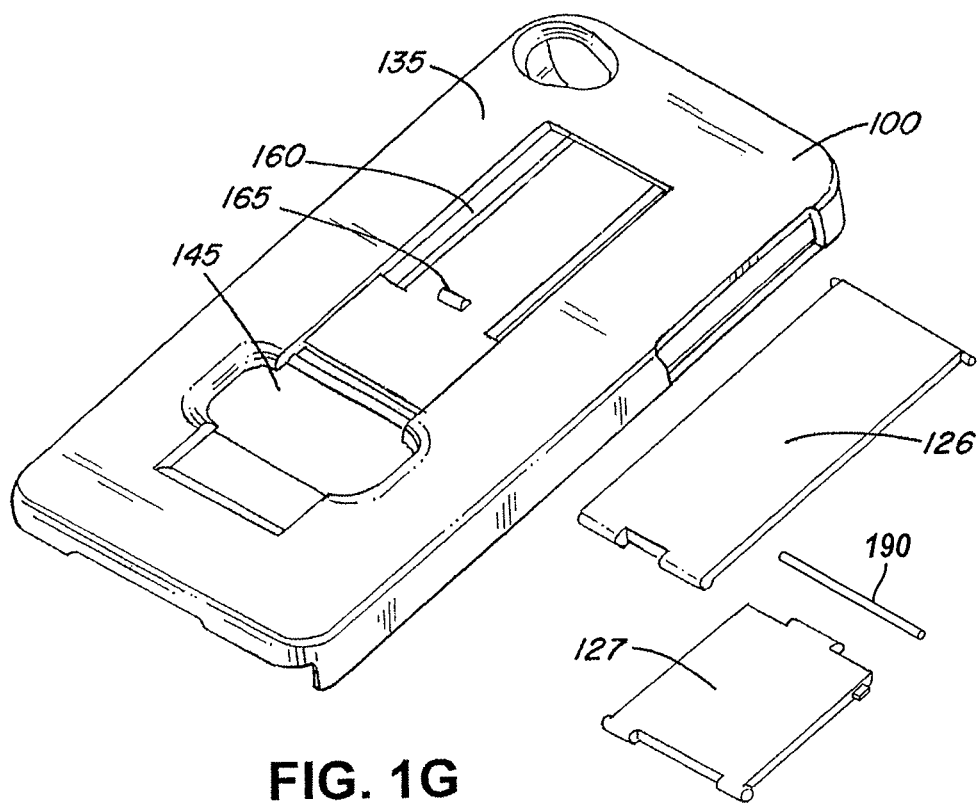
FIG. 1G illustrates a perspective deconstructed rear view of the protective case of FIG. 1F according to one implementation of the present disclosure.

FIG. 1G is a deconstructed view of the protective case 100 showing the sliding plate 126 and the pivoting plate 127 removed from the protective case 100 for clarity, and the pin 190 removed from between the sliding plate 126 and the pivoting plate 127.

FIGS. 2A-2C illustrates a sliding plate 226, which may, in one implementation, be the sliding plate 126 of FIG. 1G. FIG. 2A depicts an outer surface of the sliding plate 226. As shown in FIG. 2A, the sliding plate 226 is flat, thin and rectangular shaped. The sliding plate 226 includes a pair of notches 270 on a non-pivot edge 236, and a pair of outer hinge portions 275, which are spaced apart and defining therebetween an inner hinge receive portion 239 on a pivot edge 234. As illustrated in FIGS. 2B and 2C, the outer hinge portions 275 may appear to protrude in the direction of an inner surface of the sliding plate 226 and, in one or more implementations may actually incorporate hooks or hook-like devices. Moreover, in certain implementations, the outer hinge portions 275 may have a hole or similar opening for the pin 190 to extend through the outer hinge portions 275.

FIG. 2B shows an inner surface of the sliding plate 226. The inner surface of the sliding plate 226 includes a small groove 277. The small groove 277 is located such that it receives the stopper 165 when the sliding plate 226 is in the closed position, allowing the sliding plate 226 to fully retract and lay flat against the back side 135.

Figure 2G:
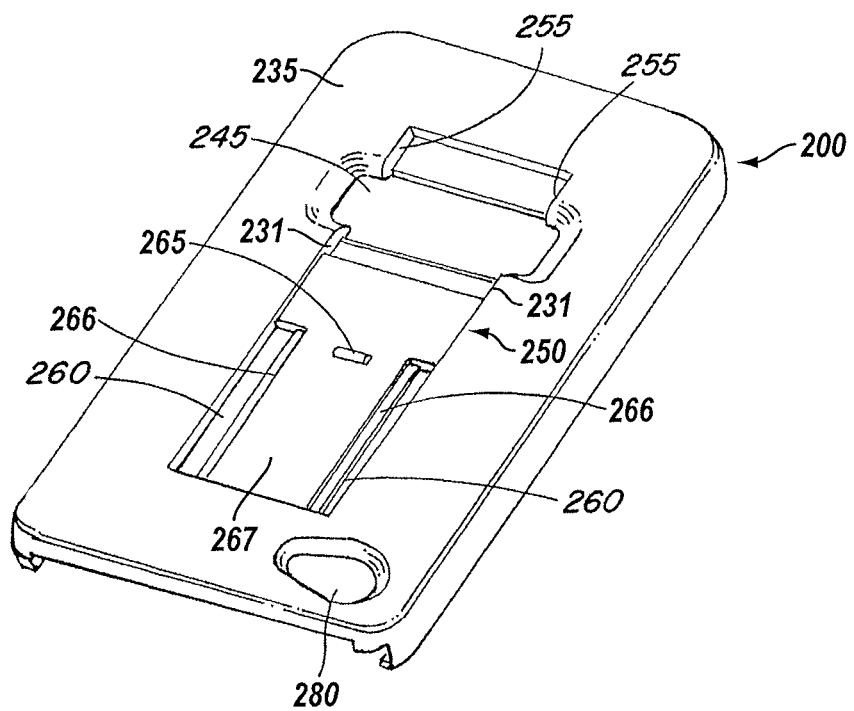
FIG. 2G illustrates a perspective rear outer view of the protective case without the stand portion attached according to one implementation of the present disclosure.

FIGS. 2D-2F illustrates a pivoting plate 227, which may, in one implementation, be the pivoting plate 127 of FIG. 1G. As shown in FIG. 2D, the pivoting plate 227 is flat, thin and rectangular shaped. Moreover, the pivoting plate 227 is shorter than the sliding plate 226 in order to achieve the desired viewing angle when the stand portion 125 is in the open position. The pivoting plate 227 includes a pair of pivot teeth 228 protruding from the pivoting plate 227 near a pivot edge 244. The pivot teeth 228 may, in one implementation, be inserted into pivot grooves 255 of a stand receiving portion 250 in FIG. 2G to allow the pivoting plate 227 to pivot between the closed position (where the pivoting plate 227 is substantially parallel and flat against the back side 135 of the protective case 100) and the open position (where the pivoting plate 227 is nearly perpendicular to the surface of the back side 135).

A hinge edge 246 is opposite the pivot edge 244. The pivoting plate 227 includes a pair of locking teeth 230 near the hinge edge 246. The locking teeth 230 are configured to be received by locking grooves 231 in FIG. 2G such that the pivoting plate 227 is locked into the closed position when the locking teeth 230 are engaged by the locking grooves 231.

Also near the hinge edge, the pivoting plate 227 includes an inner hinge portion 276. In one implementation, the inner hinge portion 276 may be longer than the inner hinge receive portion 239 of FIG. 2A and may further include hooks (not shown). In this manner, the inner hinge portion 276 substantially fills the inner hinge receiving portion 239 of FIG. 2A and is enabled to engage and mate with the outer hinge portion 275 of FIG. 2A to substantially form a hinge, such as the hinge 128. Further, the pin 190 may be configured to extend through the outer hinge portions 275 and the inner hinge portion 276 to strengthen the hinge 128 without restricting or limiting its movement. The hinge 128 allows the sliding plate 226 and the pivoting plate 227 to flatten out to the closed position (such that both the sliding plate 226 and the pivoting plate 227 are substantially parallel, flat and housed within the stand receiving portion 250) or be brought together such that they form an acute angle (e.g., a 40 degree to 50 degree angle) which enables the protective case 100 to sit at an approximately a 60 degree angle regardless of the orientation of the protective case 100. Other mating techniques for forming hinges known in the art may also be substituted and are within the spirit and scope of this disclosure.

FIG. 2E shows an inner surface of the sliding plate 227. As seen in FIG. 2E, exposed edges 229 are indented, which make the exposed edges 229 thinner than the rest of the pivoting plate 227. When the pivoting plate 227 is in the closed position, overlapping indent 245 in FIG. 2G, the gap from indent 245 and the thinner exposed edges 229 provides space for the user to grasp and pull out the pivoting plate 227. For example, the user's fingernails or fingertips may fit in this gap to give the user enough grip to disengage the locking teeth 230 from the locking grooves 231.

FIG. 2G illustrates the protective case 200 (which may be the protective case 100 of FIG. 1G). The back side 235 of the protective case 200 defines a stand receiving portion 250 and a camera hole 280. The stand receiving portion 250 is designed to house the sliding plate 226 and the pivoting plate 227, thereby enabling the plates to function and prop up the mobile device 130 housed within the protective casing 200 when desired by the user. The stand receiving portion 250 may be substantially rectangular in shape except for the indents 245 which jut outward while having inwardly tapered edges to allow for a user to reach his fingers into the stand receiving portion 250 to manipulate the pivoting plate 227 and disengage the locking teeth 230. The stand receiving portion 250 also includes a pair of pivot grooves 255 which are configured to receive a corresponding pair of pivot teeth 228 on the pivoting plate 227. In this manner, the pivoting plate 227, when inserted into the pivot grooves 255, may pivot in the manner described above. The stand receiving portion 250 may also include parallel tracks 260 which include an upper barrier 266 and a lower sliding surface 267. The sliding plate 226 can slide back-and-forth along the parallel tracks 260 over the lower sliding surface 267 without sliding or falling out of the parallel tracks 260 because the upper barrier 266 receives the notches 270 of the sliding plate 226. The stand receiving portion 250 may further include a stopper 265 for locking the sliding plate 226 in the open position when the user manipulates the non-pivot edge 236 beyond the stopper 266.

In one implementation, the sliding plate 226 may be about 54 millimeters (mm) by about 26 mm, and the pivoting plate 227 may be about 27 mm by about 26 mm. The stand receiving portion 250 may be about 81 mm by about 26 mm. The dimensions and ratios thereof allow the sliding plate 226 and the pivoting plate 227 to fit within the stand receiving portion 250 while providing the desirable, consistent viewing angle regardless of the orientation.

Furthermore, the protective case 200 may be constructed out of PC-110 which prevents shrinking, distortion or other undesirable defects. The outer surfaces of the protective case 200, in particular the back side 235 and the outer surfaces of the sliding plate 226 and the pivoting plate 227, may be textured or patterned for added grip.

The dimensions and materials discussed herein are only an example and are not intended to limit the scope of the disclosure. Indeed, one of ordinary skill in the art will recognize that the dimensions possible are limitless.

Certain implementations have been disclosed to clarify the concepts including the above structural configurations. However, one skilled in the art will recognize that an endless number of implementations may be performed with the concepts herein.

Unless otherwise indicated, all numbers expressing quantities of ingredients, volumes of fluids, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or implementations of the disclosure disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain implementations of this disclosure are described herein, including the best mode known to the inventors for carrying out the disclosure. Of course, variations on these described implementations will become apparent to those of ordinary skill in the art upon reading the foregoing description. The inventor expects skilled artisans to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Furthermore, certain references have been made to patents and printed publications throughout this specification. Each of the above-cited references and printed publications are individually incorporated herein by reference in their entirety.

Specific implementations disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Implementations of the disclosure so claimed are inherently or expressly described and enabled herein.

In closing, it is to be understood that the implementations of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

What is claimed is:

1. A case for a mobile device comprising:
a body configured to cover the mobile device and having a length and a width, the length being greater than the width, the body having a top side extending along the width of the body, a bottom side extending along the width of the body, a left side extending along the length of the body, a right side extending along the length of the body, and a back side, the back side having a back surface defining a stand receiving portion;
a pair of parallel tracks defined by the stand receiving portion and each extending in a direction from the bottom side of the body towards the top side of the body;
a stopper on the stand receiving portion; and
a stand configured to hold the mobile device at a viewing angle when the stand is in an open position and configured to retract into the stand receiving portion when the stand is in a closed position, the stand including:
a sliding plate having a first end and a second end at the portion of the sliding plate that is most distal to the first end of the sliding plate, the sliding plate configured to fit within the stand receiving portion in the closed position, the first end configured to slide within the pair of parallel tracks between the closed position and the open position, the sliding plate locked into the open position by the stopper; and
a pivoting plate having a first end and a second end at the portion of the pivoting plate that is most distal to the first end of the pivoting plate, the pivoting plate configured to fit within the stand receiving portion in the closed position, the first end of the pivoting plate connected to the second end of the sliding plate at a hinge, the second end of the pivoting plate connected to the body and configured to pivot relative to the body;
wherein the bottom side of the body and the hinge are contact points for holding the mobile device at the viewing angle in a portrait-style orientation, and the left side or the right side of the body and the hinge are contact points for holding the mobile device at the viewing angle in a landscape-style orientation.

2. The case of claim 1, wherein the body further comprises at least one cutout opening for exposing ports of the mobile device.

3. The case of claim 1, wherein the sliding plate further comprises a small groove for receiving the stopper in the closed position.

4. The case of claim 1, wherein the second end of the sliding plate further comprises an outer hinge portion, the first end of the pivoting plate further comprises an inner hinge portion, and the hinge further comprises a pin extending through the outer hinge portion and the inner hinge portion.

5. The case of claim 1, wherein the viewing angle is approximately 60 degrees.

6. The case of claim 1, wherein the pivoting plate further comprises a pair of locking teeth and the stand receiving portion further comprises a pair of locking grooves configured to receive the pair of locking teeth such that the pivoting plate locks into the closed position by the locking teeth.

7. The case of claim 1, wherein the sliding plate has a rectangular shape, with the first end of the sliding plate at one side of the rectangular shape, and the second end of the sliding plate at an opposing side of the rectangular shape; and
the pivoting plate has a rectangular shape, with the first end of the pivoting plate at one side of the rectangular shape, and the second end of the pivoting plate at an opposing side of the rectangular shape.

8. A case for a mobile device comprising:
a body configured to cover the mobile device and having a length and a width, the length being greater than the width, the body having a top side extending along the width of the body, a bottom side extending along the width of the body, a left side extending along the length of the body, a right side extending along the length of the body, and a back side, the back side having a back surface defining a stand receiving portion;
a pair of parallel tracks defined by the stand receiving portion and each extending in a direction from the bottom side of the body towards the top side of the body;
a groove defined by the stand receiving portion;
a stopper on the stand receiving portion; and
a stand configured to hold the mobile device at a viewing angle when the stand is in an open position and configured to retract into the stand receiving portion when the stand is in a closed position, the stand including:
a sliding plate having a rectangular shape with a first end at one side of the rectangular shape and a second end at an opposing side of the rectangular shape, the sliding plate configured to fit within the stand receiving portion in the closed position, the first end having a pair of notches configured to slide along the pair of parallel tracks between the closed position and the open position, the sliding plate locked into the open position by the stopper; and
a pivoting plate having a rectangular shape with a first end at one side of the rectangular shape and a second end at an opposing side of the rectangular shape, the pivoting plate configured to fit within the stand receiving portion in the closed position, the second end of the pivoting plate having a pair of pivot teeth configured to fit within the groove such that the pivoting plate pivots along the pair of pivot teeth, the first end of the pivoting plate connected to the second end of the sliding plate at a hinge;

wherein the bottom side of the body and the hinge are contact points for holding the mobile device at the viewing angle in a portrait-style orientation, and the left side or the right side of the body and the hinge are contact points for holding the mobile device at the viewing angle in a landscape-style orientation.

9. The case of claim 8, wherein the body further comprises at least one cutout opening for exposing ports of the mobile device.

10. The case of claim 8, wherein the sliding plate further comprises a small groove for receiving the stopper in the closed position.

11. The case of claim 8, wherein the second end of the sliding plate further comprises an outer hinge portion, the first end of the pivoting plate further comprises an inner hinge portion, and the hinge further comprises a pin extending through the outer hinge portion and the inner hinge portion.

12. The case of claim 8, wherein the viewing angle is approximately 60 degrees.

13. The case of claim 8, wherein the pivoting plate further comprises a pair of locking teeth and the stand receiving portion further comprises a pair of locking grooves configured to receive the pair of locking teeth such that the pivoting plate locks into the closed position by the locking teeth.

14. The case of claim 8, wherein the back surface, the sliding plate, and the pivoting plate has a textured outer surface.

15. A case for a mobile device comprising:
- a body configured to cover the mobile device and having a length and a width, the length being greater than the width, the body having a top side extending along the width of the body, a bottom side extending along the width of the body, a left side extending along the length of the body, a right side extending along the length of the body, and a back side, the back side having a back surface defining a stand receiving portion;
- a pair of parallel tracks defined by the stand receiving portion and each extending in a direction from the bottom side of the body towards the top side of the body;
- a groove defined by the stand receiving portion;
- an indent portion defined by the stand receiving portion;
- a stopper on the stand receiving portion; and
- a stand configured to hold the mobile device at a viewing angle when the stand is in an open position and configured to retract into the stand receiving portion when the stand is in a closed position, the stand including:
  - a sliding plate having a first end and a second end at the portion of the sliding plate that is most distal to the first end of the sliding plate, the sliding plate configured to fit within the stand receiving portion in the closed position, the first end having a pair of notches configured to slide along the pair of parallel tracks between the closed position and the open position, the sliding plate locked into the open position by the stopper; and
  - a pivoting plate having a first end and a second end at the portion of the pivoting plate that is most distal to the first end of the pivoting plate, the pivoting plate configured to fit within the stand receiving portion and overlap the indent portion in the closed position such that at least one edge of the pivoting plate is exposed, the second end of the pivoting plate having a pair of pivot teeth configured to fit within the groove such that the pivoting plate pivots along the pair of pivot teeth, the first end of the pivoting plate connected to the second end of the sliding plate at a hinge;
  - wherein the bottom side of the body and the hinge are contact points for holding the mobile device at the viewing angle in a portrait-style orientation, and the left side or the right side of the body and the hinge are contact points for holding the mobile device at the viewing angle in a landscape-style orientation.

16. The case of claim 15, wherein the body further comprises at least one cutout opening for exposing ports of the mobile device.

17. The case of claim 15, wherein the sliding plate further comprises a small groove for receiving the stopper in the closed position.

18. The case of claim 15, wherein the second end of the sliding plate further comprises an outer hinge portion, the first end of the pivoting plate further comprises an inner hinge portion, and the hinge further comprises a pin extending through the outer hinge portion and the inner hinge portion.

19. The case of claim 15, wherein the pivoting plate further comprises a pair of locking teeth and the stand receiving portion further comprises a pair of locking grooves configured to receive the pair of locking teeth such that the pivoting plate locks into the closed position by the locking teeth.

20. The case of claim 15, wherein the at least one edge of the pivoting plate further comprises an inner cutout portion.

* * * * *